United States Patent [19]
Carrillo

[11] Patent Number: 6,139,098
[45] Date of Patent: Oct. 31, 2000

[54] BICYCLE SEAT

[76] Inventor: Juan R. Carrillo, 405 N. 8th St., Alpine, Tex. 79830

[21] Appl. No.: 09/349,042

[22] Filed: Jul. 7, 1999

[51] Int. Cl.$^7$ ....................................................... B62J 1/00
[52] U.S. Cl. .......................................... 297/202; 297/195.1
[58] Field of Search ................................. 297/195.1, 201, 297/202

[56] References Cited

U.S. PATENT DOCUMENTS

| | | | |
|---|---|---|---|
| 572,432 | 12/1896 | Maloney | 297/202 |
| 575,509 | 1/1897 | Newell | 297/201 X |
| 584,637 | 6/1897 | Jarvis | 297/202 |
| 591,330 | 10/1897 | Downes . | |
| 603,734 | 5/1898 | Peck et al. . | |
| 608,882 | 8/1898 | Jamieson . | |
| 694,875 | 3/1902 | Meighan . | |
| 1,858,477 | 5/1932 | Blake | 297/202 |
| 4,063,775 | 12/1977 | Mesinger . | |
| 4,387,925 | 6/1983 | Barker et al. . | |
| 4,773,705 | 9/1988 | Terranova . | |
| 4,850,643 | 7/1989 | Rollman . | |
| 4,898,422 | 2/1990 | West, III . | |
| 5,011,222 | 4/1991 | Yates et al. . | |
| 5,387,025 | 2/1995 | Denisar . | |
| 5,709,430 | 1/1998 | Peters . | |
| 5,863,094 | 1/1999 | Endo . | |

*Primary Examiner*—Peter R. Brown
*Attorney, Agent, or Firm*—Royston, Rayzor, Vickery, Novak & Druce, L.L.P.

[57] ABSTRACT

A bicycle seat designed for optimized anatomical protection of a cyclist operating a bicycle having an upper seating surface adapted to incline from a lower forward portion, upward to an upper backward portion. The lower forward portion has an upward extending projection establishing a front catch for the gluteal fold region of the cyclist's buttocks. In addition, the bicycle seat includes a support having a forward frame member pivotally attached to a trailing beam that includes a first side extension and a second side extension coplanar with the first extension. The support provides reinforcement for a cushion including the upper seating surface and a stem portion which is aligned over the forward frame member. A channel, formed in the cushion, extends from the stem portion, flanked by a pair of elongate pads each having a front end and a rear end. One of the pair of elongate pads rests on the first side extension of the trailing beam with the other elongate pad positioned over the second side extension of the trailing beam. Each of the pair of elongate pads has a bulbous projection adjacent each of the front end and the rear end to provide anatomical protection for body parts of a cyclist resting on the bicycle seat.

17 Claims, 3 Drawing Sheets

BICYCLE SEAT

TECHNICAL FIELD

The present invention relates generally to bicycle seats, and more specifically to bicycle seats including shaped portions for comfortable support and prevention of injury to sensitive portions of a cyclist's anatomy.

BACKGROUND OF THE INVENTION

Over a period of more than a century, the shaping of bicycle seats has provided a variety of designs to improve rider comfort, or prevent damage to sensitive portions of a cyclist's body or both. The avoidance of damage to sensitive body parts dealt with cut-outs or provision of suitable cavities which prevented contact between the bicycle seat and particularly the rider's genitalia. Minimization of contact relied essentially upon four approaches, including removal of pommel or nose extensions, cut-outs or cavities for genital accommodation, split seating arrangements, and hinged seat elements that pivoted with a rider's movement.

Split seating arrangements have been commonly used. U.S. Pat. No. 591,330 describes the use of two coiled springs mounted on a horizontal bar with suitable adjustment to vary separation between the springs. A cover, shaped like an inverted saucer, protects the rider from the surface of the springs. Spring separation provides buttock support adjusted to individual rider comfort. Other references dealing with split bicycle seats include U.S. Pat. Nos. 608,682; 694,875; 4,063,775; 4,387,925; 5,387,025 and 5,709,430. Bicycle seats of some of these references include pommel or nose extensions capable of causing injury to a rider subjected to forward displacement from the buttock support pads in the event of a collision or poor adjustment of the support pads. However, most of the references relate to pommel-free seats including buttock supports with variable support separation and angle adjustment for optimum comfort during riding.

Additional references, free from pommels or other types of seat extension, include U.S. Pat. Nos. 4,773,705 and 4,850,643. In both cases, the support for the cyclist is a unitary seat with contours shaped to fit the buttocks of the rider. A sprung frame, beneath the seat, provides added comfort for the cyclist. With the relatively planar form of unitary, pommel-free bicycle seats, there is little to prevent a rider from slipping forward and falling from the front edge of the seat. If a cyclist is dislodged from the seat with sufficient frequency, the required act of re-seating will become a source of irritation.

The use of pommel free bicycle seats to prevent injury to cyclists' genitalia is only one design option. Another option involves removal or displacement of material from the bicycle seat while retaining the pommel or forward seat extension. For example, U.S. Pat. No. 4,898,422 modifies a traditional "arrow head" shaped bicycle saddle by incorporating a central area cut-out to provide a saddle opening around external genitalia. The area removed from the saddle lowers the likelihood of injury to the cyclist. U.S. Pat. No. 5,011,222 includes a depressed cavity strategically positioned in the upper surface of a traditional bicycle seat and utilized for the same purpose as the saddle opening previously discussed.

Hinged seat elements that pivot with a rider's movement provide additional comfort, especially during long, tiring journeys. U.S. Pat. No. 603,734 describes a durable bicycle seat with an improved larger surface area, compared to bicycle seats in use at that time. A hinged flap under each of the rider's thighs rose and fell following knee motion during rotation of the bicycle pedals. The flap lowered, with downward pressure on the pedal, then adopted a supporting position under the rising thigh on the return stroke of the pedal. Similar thigh-supporting elements exist in the design of bicycle seats described in U.S. Pat. Nos. 5,387,025 and 5,863,094. In the latter case, multiple hinges ensure more consistent contact between the saddle and the underside of the cyclist's thigh for comfort during extended operation. While desirable, the additional comfort of hinged bicycle seats relies upon fault-free operation of relatively complex mechanical structures.

In view of the above described deficiencies associated with the use of known designs for bicycle seats, the present invention has been developed to alleviate these drawbacks and provide further benefits to the user. These enhancements and benefits are described in greater detail hereinbelow with respect to several alternative embodiments of the present invention.

DISCLOSURE OF THE INVENTION

The present invention in its several disclosed embodiments alleviates the drawbacks described above with respect to conventionally designed bicycle seats and incorporates several additionally beneficial features representing a departure from seat design features previously considered. Earlier bicycle seat designs emphasized suitably contoured depressions for comfort and accommodation of key parts of a rider's anatomy. No reference considered raising the cyclist, on cushioned projections, above the major plane of the cycle seat creating a left and right gluteal fold/ischium catch centrally separated by a contoured dip or depression which in combination with a channel extension provides for genital clearance. The current invention provides this capability along with the unique feature of at least one saddle contact edge, also referred to herein as a pivot edge, with angular adjustment to prevent the cyclist from slipping forward over the front edge of the seat. A rear contact edge, contacting the rider's gluteus maximus, may be included to prevent the cyclist from slipping from the back of the bicycle seat.

Using cushioned projections, or protrusions, the bicycle operator may ride perched above potentially damaging parts of the cycle seat. Provision of the desired seat contours requires an upper seating surface adapted for inclination from a lower forward portion upward to an upper backward portion. The lower forward portion has a forward upward extending projection as a front catch for the gluteal fold to prevent a rider from slipping forward off of the bicycle seat of the present invention. This forward upward projection features a centrally located depression or dip combined with a channel extension for the obvious clearance of genitalia. A rearward upward extending projection located at the upper backward portion of the seat establishes a back catch for the gluteus maximus of the cyclist for avoiding rearward slippage of the cyclist from the bicycle. In this manner, a rider's correct seating position with respect to the bicycle seat of the present invention is maintained. It places the rider's buttocks between the forward and rearward upward extending projections, limiting movement therebetween. This allows retention of a forward nose extension, stem or pommel portion of the saddle for added stabilization and control as needed to balance the moving bicycle.

The bicycle seat of the current invention includes a support below the cushion that provides comfort and protection for the bicycle rider. Because of anatomical differences between riders, the support preferably includes a hinge mechanism located between forward and trailing sections that provides angular adjustment for optimum comfort. The comfort angle, set by adjustment of the support, establishes the relative positioning of parts of a cushion that fit over the support. An important consideration in cushion positioning is the angle of at least one protrusion towards the front edge of the buttock supporting or saddle part of the bicycle seat. The protrusion provides a ledge to make contact with the gluteal fold area of the buttocks and the underlying ischium bone. With correct angular adjustment of the support, the ischium bone lodges against the protrusion preventing the cyclist from slipping forward over the front edge of the seat on to the nose extension of the seat, or the cross-bar of the cycle. Without this restriction, the bicycle rider risks injury to sensitive parts of the anatomy, such as genitalia. In effect, the protrusion limits movement between the cyclist, and a seat of the invention. This produces a comfortable seating position that allows unimpeded pedaling, leading to highly efficient bicycle operation.

More particularly the current invention provides a bicycle seat designed for optimum anatomical protection of a cyclist. The bicycle seat comprises a support having a forward frame member pivotally attached to a trailing beam that includes a first side extension and a second side extension having a top surface coplanar with the upper surface of the first side extension. A cushion, engageable with the support, has a contact surface for contact with at least the forward frame member and the first and second side extensions of the trailing beam. The cushion further includes a stem portion, or nose extension, aligned over the forward frame member, forward of a channel formed in the cushion. A pair of elongate pads flank the channel with each pad having a front end and a rear end. One of the pair of elongate pads lies over the first side extension of the trailing beam with the other of the pair of elongate pads positioned over the second side extension of the trailing beam. Each of the pair of elongate pads has a bulbous protrusion adjacent each of its front end and rear end with the bulbous protrusions providing anatomical protection for body parts of a cyclist resting on the bicycle seat.

As used herein, the terms projection, protrusion, contact edge and pivot edge have essentially the same meaning and refer to similar structures of the disclosed bicycle seat. Similarly, the nose extension of the bicycle seat may also be described as a control horn, or stem, or pommel.

The beneficial effects described above apply generally to the exemplary devices and mechanisms disclosed herein for a bicycle seat. The specific structures through which these benefits are delivered will be described in detail hereinbelow.

BRIEF DESCRIPTION OF THE DRAWINGS

The invention will now be described in greater detail in the following way of example only and with reference to the attached drawings, in which.

MODE(S) FOR CARRYING OUT THE INVENTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
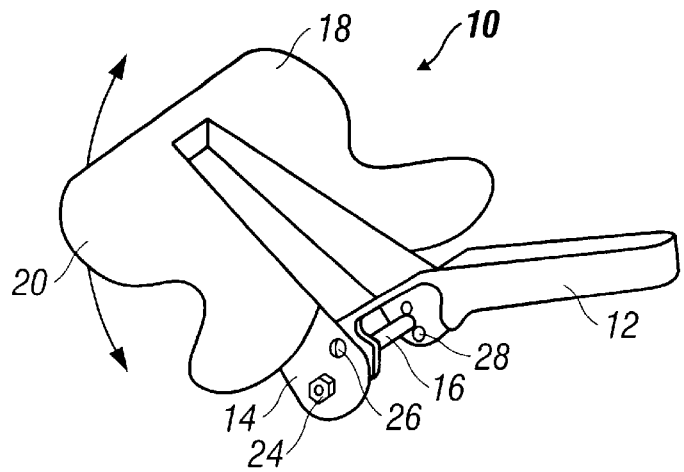
FIG. 1 is a perspective view of a support according to the current invention including a cut-away view showing details of pivotal attachment of a forward frame member to a trailing beam equipped with side extensions.
Figure 7:
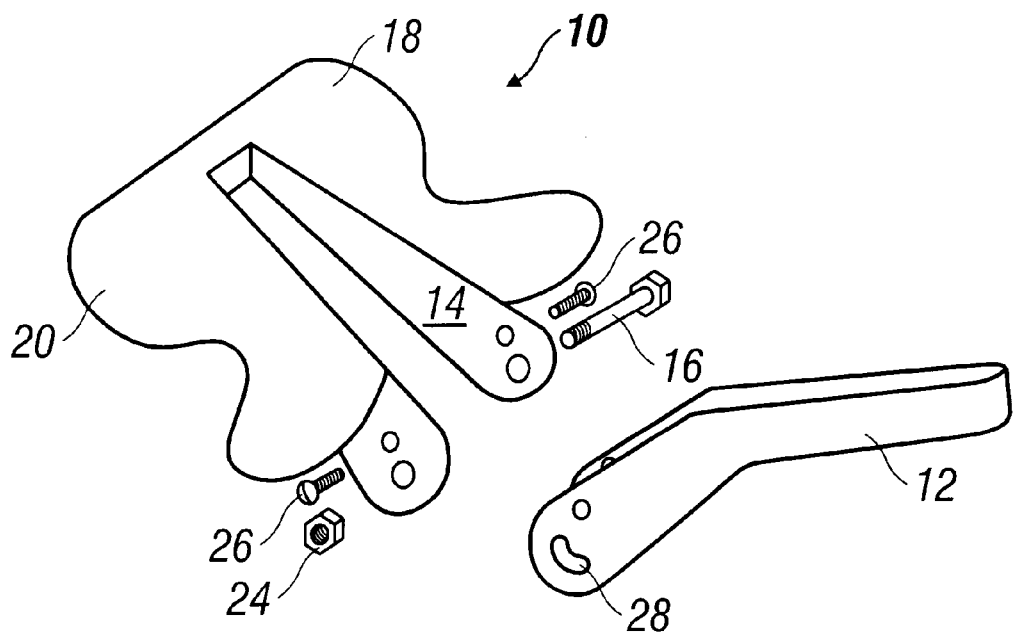
FIG. 7 is an exploded perspective view showing the pivoting hinge of a support of the present invention.

Referring to the figures wherein like numerals refer to like parts throughout the several views, FIG. 1 is a perspective view of a support 10 of the present invention including a forward frame member 12 pivotally attached to a trailing beam 14. The trailing beam 14 is equipped with a first side extension 18 and a second side extension 20. Pivotal adjustment of the trailing beam 14 relative to the forward frame member 12 requires a means for angular adjustment which, for FIG. 1, comprises a hinge mechanism secured with a bolt 16 held by a lock nut 24. FIG. 7 provides additional detail of the hinge mechanism, with the support 10 shown in exploded view. The trailing beam 14 has limited rotation around a pivot pin 26 with the extent of movement controlled by an arcuate slot 28 placed in the forward frame 1 2 to receive the securing bolt 16. A cotter pin, nut and bolt combination, rivet or other suitable substitute may be used in place of the pivot pin 26. The angle between the forward frame member 1 2 and the trailing beam 14 depends upon a rider's preference for comfort using pivotal adjustment of the trailing beam 14 while the forward frame member 12 remains essentially horizontal. Preferably the arc of the slot 28 has a length of about 2.5 centimeters allowing the trailing beam 14 to describe an angle from about 25° to about 50° relative to a vertical line through the pivot point with the forward frame member 12. This produces an angle between the forward frame member 12 and the trailing beam 14 from about 115° to about 140°. Preferably the length of the slot 28 produces an angle between about 30° and 45°, resulting in angular displacement of the trailing beam 14 from the forward frame member 12 from about 120° to about 135°.

As shown in FIG. 1, the first side extension 18 and second side extension 20 appear as planar sections attached to the trailing beam 14. These extensions 1 8,20 may take other forms provided they support the cyclist's weight when combined with the cycle seat cushion 40. Other forms of extension 18,20 may include rigid mesh or grid structures and cantilevered bars, provided the support 10 remains strong enough to withstand the rider's body weight and survives typical, repeated impact associated with bicycle travel over normal terrain.

Figure 2:
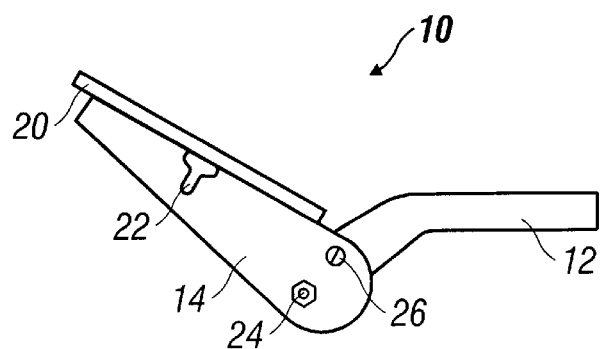
FIG. 2 is a side elevational view of a support of the invention.

Considering cyclists' weight variations and the potential for use of the present bicycle seat on off-road styled bicycles, the need exists to provide support braces or spars together with the first and second side extensions 18,20 attached to the trailing beam 14. FIG. 2 includes such a support brace 22 which is also shown in dotted line outline in FIG. 3. Although depicted as a narrow strip or rib, the support brace 22 may adopt a variety of shapes to reinforce different sized areas of the extensions. In one embodiment, the forward frame member 12 is substantially triangle-shaped, with the bolt 16 forming one side, or the base, of the triangle, and the forward frame member having a "V" shape which forms the other two sides of the triangle. In this embodiment, one side of the "V" is a first end connected to the bolt 16, the "V" projecting forward, away from the trailing beam 14 and from the bolt 16 to form the apex of the triangle, and the other side of the "V" is a second end connected to the bolt and completing the triangle. In this embodiment, the forward frame member 12 is made from a thin strip of rigid material shaped into a "V" shaped form.

Figure 3:
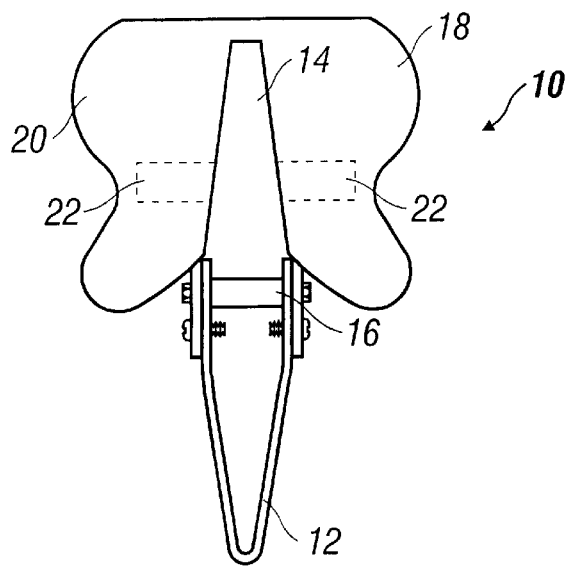
FIG. 3 is a top plan view of a support of the invention providing detail of pivoting and adjustment means.

Suitable materials for the bicycle seat support 10 include metals, rigid plastics and reinforced plastics. Preferably, fabrication of the forward frame member 12 and trailing beam 14 involves the use of brackets shaped from sheet or bar material, as shown in FIGS. 1–3. Alternatively, both the forward frame member 12 and the trailing beam 14 may take the form of solid sections, suitably shaped to satisfy design criteria. Also, the side extensions 18,20 may be made using sheet or bar stock with sheet as the preferred material for forming the planar structures 18,20 attached to the trailing beam 14 as shown in FIG. 1. Welding, brazing, riveting or other suitable means provide rigid attachment of the side extensions 18,20 to the trailing beam 14. The method selected depends upon the material chosen for constructing the support 10.

Figure 4:
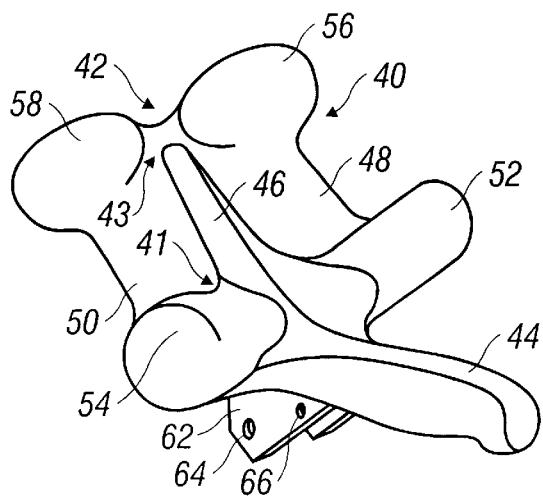
FIG. 4 is a perspective view of a cushion of the invention showing elongate pads having protrusions for cyclist support.

FIG. 4 is a perspective view of a cushion 40 of the invention including a stem 44 which may also be referred to herein as a nose extension or control horn. The stem 44 is especially used for bicycle balance control, normally under the influence or pressure of the cyclist's inner thigh, and is not part of the surface of the cushion 40 on which a cyclist will normally be seated. Indeed, a distinguishing feature of the invention is the provision of raised portions of the cushion 40 which avoids jolting contact between the cyclist and the stem 44, contact which can potentially cause pain and injury to the crotch area of the cyclist's body.

By reference to FIG. 1 and FIG. 4, it will be appreciated that the stem 44 of the cushion 40 fits over the forward extension 12 with a first elongate pad 48 supported on the first side extension 18 and a second elongate pad 50 resting in contact with the second side extension 20. Thus the cushion 40 covers the support 10 to produce the padded bicycle seat of the invention. The underside of the cushion 40 includes a bracket 62 that fits over the pivot means between the front frame member 12 and the trailing beam 14. A bolt orifice 64 and a pivot pin opening 66 accommodate the hinge bolt 16 and pivot pin 26 respectively. Preferably, the bracket 62 has a V-shape which provides effective support for the combined saddle 42 and stem 44 parts of the cushion 40.

Figure 8:
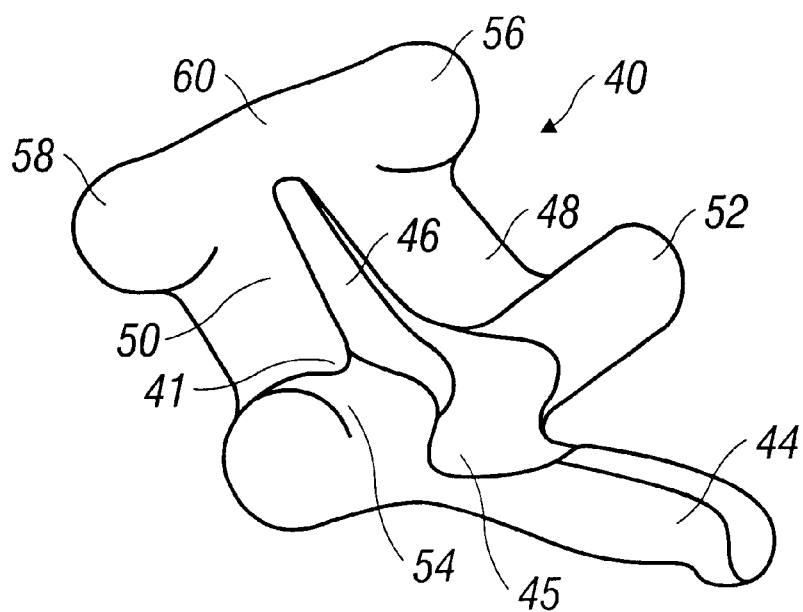
FIG. 8 is a perspective view showing an alternate cushion of the present invention including a widened channel portion as a dip or depression in the bicycle seat of the invention.

The cushion 40 includes a number of design elements in its upper seating surface or saddle 42 that provide support, comfort and a suitable angular position for the cyclist to ride for optimum riding efficiency. One of the design elements is a channel 46, extending backward from stem 44, which may have a preferred section 45, as shown in FIG. 8, beginning about 1.5" to about 2.0" in front of the outer ridge of the pivot edge. This section provides a suitably contoured dip or depression 45 allowing ample clearance for the lower, genital portion of the rider's body. The channel 46 divides the upper seating surface 42 substantially into two halves. Inclusion of the channel 46 significantly reduces the likelihood of lower body contact with the fixed saddle 42 and stem 44 thereby avoiding pain and injury to the cyclist. The saddle 42 comprises a lower forward portion 41 and an upper backward portion 43. Support for a rider during cycling depends upon the position of a thigh/femoral pivot edge that cradles the gluteal fold and ischium bone region of the body producing a resting or seating position with freedom for peddling. The pivot edge contour is rounded in a fashion that gently presses into the gluteal fold until the ischium bone settles against the rear surface of the pivot edge.

In FIG. 4, the pivot edge is provided in the form of a forward upward extending projection, also referred to as a first forward protrusion 52 and a second forward protrusion 54 positioned on either side of the channel 46. The side elevation of FIG. 5 indicates how the forward protrusions 52,54 cradle the gluteal fold and the underlying ischium bone in such a way that the cyclist has limited forward movement on the saddle 42, without raising themselves above the level of the forward protrusions 52,54. The forward and upward extending projections 52,54 should not be so blunt that they fail to press into the gluteal fold muscle, nor too sharp that they represent a narrow ridge that causes discomfort. The pivot edge, represented by the forward protrusions 52,54, also provides a seating area for the upper thighs, nearest the gluteal fold, during shifting of weight, mild peddling, coasting or other low intensity riding activity.

Additional comfort sections of the cushion 40 exist in the form of a first rear projection or protrusion 56 and a second rearward projection or protrusion 58 at the upper backward portion 43 of the saddle 42. These bulbous projections or protrusions 56,58 provide limited contact of the rider's gluteus maximus with the saddle 42 which obviates the need to provide adjustment for various pelvic sizes. The cushion's 10 angular position, arranged for optimum riding efficiency, depends upon the pivotal adjustment of the underlying trailing beam 14 which sets the angle of saddle 42. Change of this angle affects the rider's forward leaning position. Preferably, the saddle should be set at an angle of 30° to 50° to a vertical line through the junction between the saddle 42 and the stem 44. A more acute angle adds aerodynamic lean for racing. However, too narrow an angle could cause the rider to slip forward over the forward protrusions 52,54. Angle adjustment of the saddle 42 is therefore important for holding the rider adjacent to the pivot edge with the gluteal fold muscle and ischium bones cradled behind the forward protrusions 52,54.

Retention of rider position is a key feature of the bicycle seat of the invention, distinguishing it from known bicycle seats and saddles. Having described the support, comfort and angular position requirements, it is important to note that the cushion 40 provides support to the buttocks of the cyclist using padded sections referred to herein as forward projections 52,54 and rearward projections 56,58. The upward extending forward projections or protrusions 52,54 restrain the cyclist against forward slippage while the upward extending rearward projections or protrusions 56,58 present a barrier to any rearward displacement from the bicycle seat of the present invention. The saddle 42 has a forward incline, leaning the cyclist forward on the saddle. The upward extending forward projections or protrusions 52, 54 have a front side inclined in the opposite direction from the saddle, or negatively inclined from the saddle 42, thus forming a catch to prevent forward slippage of the cyclist. In effect, the projections or protrusions 52,54,56,58 hold the cyclist's weight at least partly suspended above the main saddle body with suitable positioning, as previously discussed, to prevent inadvertent rider displacement, especially forward movement on to the stem 44, while riding.

Figure 6:
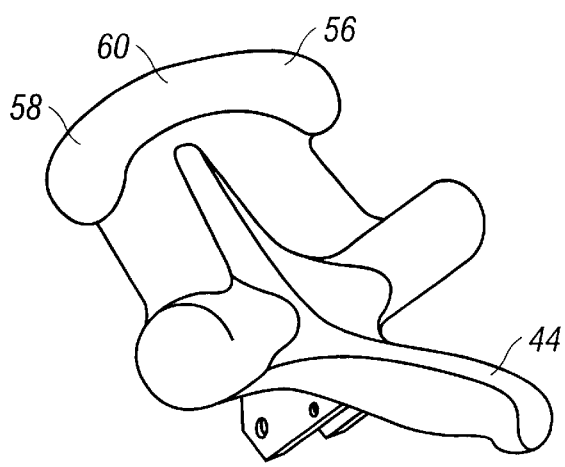
FIG. 6 is a perspective view showing a bridge between rearward protrusions of a bicycle seat of the invention.
Figure 5:
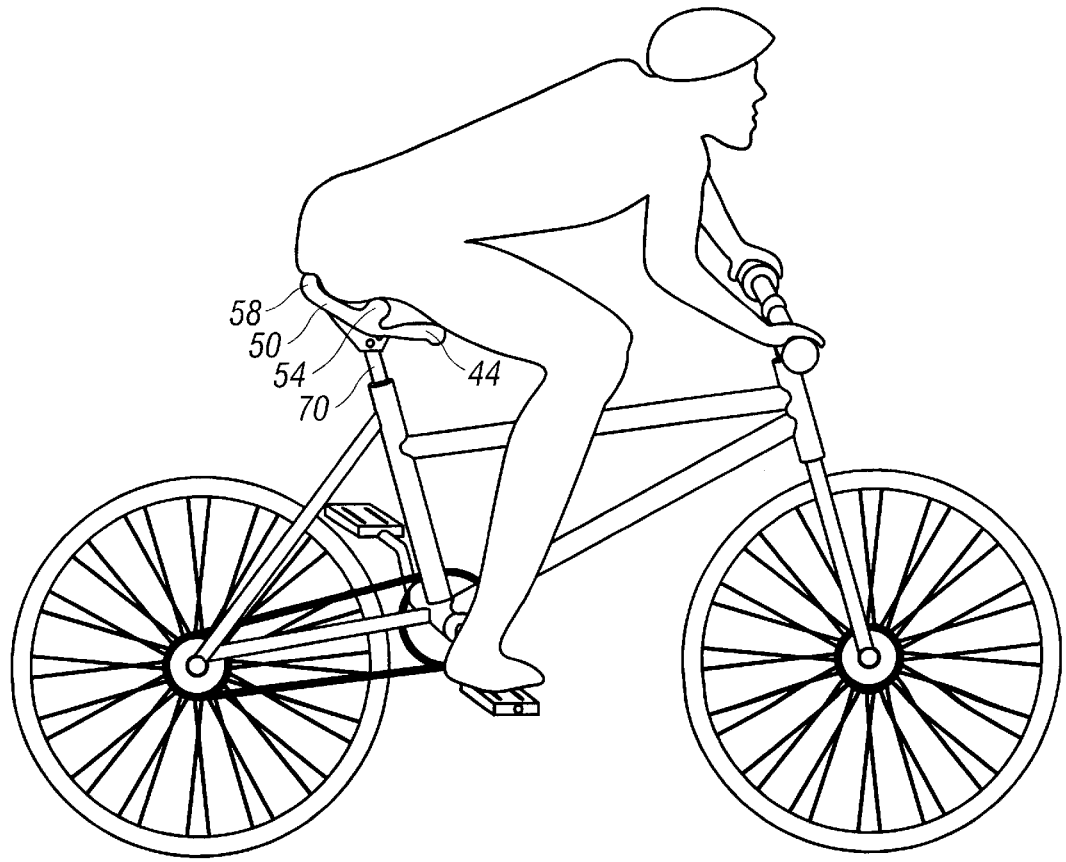
FIG. 5 shows a side elevational view representing a cyclist positioned on a bicycle seat of the invention.

FIG. 5 further shows how the cushion 40 contacts the rider against the gluteal fold and the region of the gluteus maximus. This positions the rider's femoral socket above the elongate pad portions 48,50 of the saddle 42 to reduce pressure against that portion of the body which is an active area during peddling. Depending on rider preference, a variation of a cushion of the invention is shown in FIG. 6 wherein the rearward projections 56,58 may be united by a bridge 60 for additional support and comfort for the rider's buttocks.

The cushion 40 may be manufactured from a variety of compressible, shock absorbing materials with sufficient durability and loft to provide padded comfort to parts of the anatomy in contact with the upper seating surface 42. Suitable materials include fiber filled covers and pliable plastic structures including resilient plastic foams which are preferred. Additional covering for cushions 40 of the invention may be provided in the form of fabric, plastic or flexible leather overlays.

An important consideration in coupling the bicycle seat of the present invention to the bicycle, is the shape of the bracket 62. The bracket 62 must direct weight and impact from the cushion 40 and support 10 toward the seat post 70 as shown in FIG. 5. Bracket shape is important because impact forces experienced in bicycle seats constructed according to the present invention originate from the bony pelvic and ischium bone areas, whereas with earlier seat designs much of this type of force was concentrated along the central axis of the bicycle seat with sensitive muscle tissue adjacent to the rider's genitalia taking most of the impact. Suitable bracket materials of construction include metal, rigid plastic, rigid foam and reinforced plastic.

A bicycle seat and its components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed and desired to be secured by Letters Patent is as follows:

1. A bicycle seat configured to provide comfort and security to a cyclist, said bicycle seat comprising:

an upper seating surface adapted for inclination from a lower forward portion upward to an upper backward portion thereof;

said upper seating surface having an elongate interior lengthwise channel recessed into said upper seating surface thereby defining two halves of said upper seating surface, wherein at least a portion of said upper seating surface extends continuously across said two halves of said upper seating surface;

said channel having a forward depth deeper into said upper seating surface than a rearward depth thereof; and a forward upward extending projection located at said lower forward portion of said upper seating surface thereby establishing a front catch for the gluteal fold of a cyclist for avoiding forward slippage of a riding cyclist therefrom.

2. The bicycle seat as recited in claim 1; wherein said forward upward extending projection has a rear catch surface positively inclined from a back side to a front side thereof, said rear catch surface oriented for abutting engagement with the gluteal fold of a cyclist for avoiding forward slippage of a riding cyclist therefrom.

3. The bicycle seat as recited in claim 1; wherein said upper seating surface is substantially planar in shape between said lower forward portion and said upper backward portion thereof.

4. The bicycle seat as recited in claim 1; said bicycle seat further comprising:

a rearward upward extending projection located at said upper backward portion of said upper seating surface thereby establishing a back catch for the gluteus maximus of a cyclist for avoiding rearward slippage of a riding cyclist therefrom.

5. The bicycle seat as recited in claim 6; wherein said upper seating surface, said forward upward extending projection and said rearward upward extending projection are unibodily constructed from a compressible, shock absorbing material.

6. The bicycle seat as recited in claim 1; said bicycle seat further comprising:

a forward projecting control horn configured to be positioned between a riding cyclist's legs, said forward projecting control horn having lateral sides, each lateral side configured for abutting engagement with an inner thigh of a riding cyclist during a turn.

7. A bicycle seat configured to provide comfort and security to a cyclist, said bicycle seat comprising:

an upper seating surface adapted for inclination from a lower forward portion upward to an upper backward portion thereof; and a forward upward extending projection located at said lower forward portion of said upper seating surface thereby establishing a front catch for the gluteal fold of a cyclist for avoiding forward slippage of a riding cyclist therefrom;

a rearward upward extending projection located at said upper backward portion of said upper seating surface thereby establishing a back catch for the gluteus maximus of a cyclist for avoiding rearward slippage of a riding cyclist therefrom; and said forward upward extending projection has a front catch surface negatively inclined from a back side to a front side thereof, said front catch surface oriented for abutting engagement with the gluteus maximus of a cyclist for avoiding forward slippage of a riding cyclist therefrom.

8. A bicycle seat configured to provide comfort and security to a cyclist, said bicycle seat comprising:

an upper seating surface adapted for inclination from a lower forward portion upward to an upper backward portion thereof; and a forward upward extending projection located at said lower forward portion of said upper seating surface thereby establishing a front catch for the gluteal fold of a cyclist for avoiding forward slippage of a riding cyclist therefrom;

a forward projecting control horn attached to said lower forward portion of said seat, said forward projecting control horn configured to be positioned between a riding cyclist's legs, said forward projecting control horn having lateral sides, each lateral side configured for abutting engagement with an inner thigh of a riding cyclist during a turn, said upper seating surface further comprises:
an elongate interior lengthwise channel recessed into said upper seating surface thereby defining two halves of said upper seating surface; and
a top surface of said forward projecting control horn being continuously formed as a forward extension of a bottom surface of said elongate interior lengthwise channel.

9. A bicycle seat designed for optimizing anatomical protection of a cyclist operating a bicycle, said bicycle seat comprising:
a support having a forward frame member pivotally attached to a trailing beam that includes a first side extension having an upper surface and a second side extension having a top surface coplanar with said upper surface of said first extension;
a cushion engageable with said support, said cushion having a contact surface for contact with at least said forward frame member and said first and second side extensions of said trailing beam and said cushion further having a stem portion aligned over said forward frame member, said stem portion being forward of a channel formed in said cushion, said channel flanked by a pair of elongate pads, each elongate pad having a front end and a rear end;
one of said pair of elongate pads positioned over said first side extension of said trailing beam and the other of said pair of elongate pads positioned over said second side extension of said trailing beam; and
each of said pair of elongate pads having a bulbous projection adjacent each of said front end and said rear end, said bulbous projections providing anatomical protection for body parts of a cyclist resting on said bicycle seat.

10. A bicycle seat as recited in claim 9 wherein said forward frame member is substantially triangle-shaped and said forward frame is pivotally attached to said trailing beam at a base of said triangle.

11. A bicycle seat as recited in claim 10 wherein said forward frame member is a bracket made of a thin strip of a rigid material, said bracket including a projection representing the apex of said triangle, said projection being located opposite a first end and a second end, said trailing beam pivotally attached to said forward frame member by said first end and said second end.

12. A bicycle seat as recited in claim 11 wherein said trailing beam has a proximate end and a distal end, said proximate end having at least one connecting orifice formed therein, said first end including a first hole and said second end including a second hole, said orifice, said first hole and said second hole aligned to receive a connecting bolt to pivotally attach said forward frame member to said trailing beam.

13. A bicycle seat as recited in claim 12 wherein said rigid material is selected from the group consisting of metal, rigid plastic and reinforced plastic.

14. A bicycle seat as recited in claim 9 wherein said first side extension and said second side extension are planar extensions.

15. A bicycle seat as recited in claim 14 wherein said planar extensions are shaped to include arcuate portions.

16. A bicycle seat as recited in claim 9, wherein said cushion further includes a bridge between said bulbous projections at said rear ends of said pair of elongate pads.

17. A bicycle seat as recited in claim 9, wherein pivotal movement of said forward frame relative to said trailing beam produces a change in the angle between said stem portion and said pair of elongate pads when said contact surface engages said support.

* * * * *